United States Patent
Coleman et al.

(10) Patent No.: US 10,121,071 B2
(45) Date of Patent: Nov. 6, 2018

(54) DOCUMENT VERIFICATION SYSTEM

(71) Applicant: BRITE:BILL LIMITED, Dublin (IE)

(72) Inventors: Alan Coleman, Malahide (IE); James Hannon, Drumcondra (IE); Jerome O'Flaherty, Celbridge (IE)

(73) Assignee: BRITE: BILL LIMITED, Dublin (IE)

( * ) Notice: Subject to any disclaimer, the term of this patent is extended or adjusted under 35 U.S.C. 154(b) by 0 days.

(21) Appl. No.: 15/561,493

(22) PCT Filed: Mar. 23, 2016

(86) PCT No.: PCT/EP2016/056410
§ 371 (c)(1),
(2) Date: Sep. 25, 2017

(87) PCT Pub. No.: WO2016/151028
PCT Pub. Date: Sep. 29, 2016

(65) Prior Publication Data
US 2018/0068181 A1    Mar. 8, 2018

(30) Foreign Application Priority Data
Mar. 23, 2015    (EP) .................................... 15160339

(51) Int. Cl.
*G06K 9/00* (2006.01)
*G06Q 10/10* (2012.01)
(Continued)

(52) U.S. Cl.
CPC ..... *G06K 9/00442* (2013.01); *G06F 17/2247* (2013.01); *G06F 17/2785* (2013.01);
(Continued)

(58) Field of Classification Search
CPC ............ G06K 9/00442; G06F 17/2247; G06F 17/2785; G06F 17/30011; G06Q 10/10; G06Q 10/107; G06Q 20/102; G06Q 30/04
See application file for complete search history.

(56) References Cited

U.S. PATENT DOCUMENTS 7,734,566 B2 * 6/2010 Caracas ............ G06F 17/30722
8,650,043 B1 * 2/2014 Phillips .................. G06Q 40/00
705/2
(Continued)

FOREIGN PATENT DOCUMENTS

EP    1659526 A2    5/2006

OTHER PUBLICATIONS

International Search Report from PCT Application No. PCT/EP2016/05410, dated Mar. 6, 2016.

*Primary Examiner* — Shefali D Goradia
(74) *Attorney, Agent, or Firm* — Zilka-Kotab, P.C.

(57) ABSTRACT

A verification system (1) receives batches of documents in excess of 500,000 for external document generation systems. It verifies each document without affecting the core document-generation operations of the source document generation systems, and moreover enriches the documents by adding content such as recipient messages. It normalizes each document into an instance in a mark-up language, one instance per document. In the normalized format, the system performs verification checks including semantic checking across data items in groups. The servers (10, 11) are configured as multi-threaded platforms that process the document instances in parallel, typically validating the instance documents, pattern matching for relevant facts or events and implementing business rules and output actions such as generation of a print stream. There are separate but interlinked verification (10, 11) and presentment (20, 21, 25)

(Continued)

branches. Meta data and atomic facts are generated in the verification branch and transferred to the presentment branch for use by it in document sending and possible additional personalization.

20 Claims, 3 Drawing Sheets (51) Int. Cl.
*G06Q 30/04* (2012.01)
*G06Q 20/10* (2012.01)
*G06F 17/22* (2006.01)
*G06F 17/27* (2006.01)
*G06F 17/30* (2006.01)

(52) U.S. Cl.
CPC ....... *G06F 17/30011* (2013.01); *G06Q 10/10* (2013.01); *G06Q 10/107* (2013.01); *G06Q 20/102* (2013.01); *G06Q 30/04* (2013.01)

(56) References Cited

U.S. PATENT DOCUMENTS

| | | | |
|---|---|---|---|
| 2004/0019670 A1* | 1/2004 | Viswanath | H04L 41/0253 709/223 |
| 2006/0242180 A1* | 10/2006 | Graf | G06F 17/30722 |
| 2012/0072859 A1 | 3/2012 | Wang et al. | |
| 2012/0239558 A1 | 9/2012 | Zhang | |

* cited by examiner

DOCUMENT VERIFICATION SYSTEM

INTRODUCTION

Field of the Invention

The invention relates to verification of documents. In particular, the invention relates to verification of large numbers of documents, in batches of for example greater than 500,000.

Prior Art Discussion

In such document volumes, given the extent of data and the layout in the document formats, verification can be very time-consuming both in terms of computer resources and human input.

EP1659526 (SAP) describes a system for management and verification of invoices. This includes a context builder which automatically retrieves additional information and auto-populates data fields, and an invoice processor which performs verification checks on each invoice.

The invention is directed towards providing more efficient document verification. Another object is to achieve more versatility in terms of ability to work with existing or legacy document generation systems.

Glossary

AFP, Advanced Function Presentation
ASCII, American Standard Code for Information Interchange
EDI, Electronic Data Interchange
JSON, Javascript Object Notation
SFTP, Secure File Transfer Protocol
VLAN, Virtual Local Area network
XML, Extensible markup Language

SUMMARY OF THE INVENTION

According to the invention, there is provided a document verification system comprising digital data processors programmed to provide:
  an interface configured to receive electronic document runs at a presentment stage from document generation systems in excess of 500,000 documents;
  a normalisation component configured to transfer each document to an instance in a mark-up language taxonomy with one instance per document;
  a verification engine configured to perform per-document checking by checking each document instance including semantic checking using granular semantic rules within groups of items of document data, wherein the verification engine is configured to store document instances in a relational database and to set a state including a rejected state, and to remove document instances if errors are detected;
  a rule server configured to maintain current data item contents of each group and to maintain verification rules for execution for said semantic checking within each group; and
  a feedback component arranged to provide per-document error feedback arising from operation of the verification engine, wherein the feedback component is arranged to provide feedback without affecting operation of a system which generates the documents.

Advantageously, the system can take large batches of documents generated by external document generation systems without affecting operation of such systems, which may be legacy systems such as billing systems for a large utility company with many hundreds of thousands of customers. The verification advantageously can achieve comprehensive checks by executing said rules within groups of data items, sometimes referred to as "products" within a document.

In one embodiment, the verification system interface is configured to fragment the received documents into processing jobs shared out to a cluster of data processing servers of said normalization component using middleware whereby the data processing servers can read input document files in parallel in streams, and the normalization component is configured to map each document to a mark-up language taxonomy to create said document instances, and wherein the verification engine is configured to verify the documents in real time upon receipt of the document instances, and in which wherein the verification engine servers are configured as multi-threaded platforms that process the document instances in parallel.

In one embodiment, the documents include numerical values and the semantic checking includes numerical value calculations within said groups of data items.

In one embodiment, the verification engine is configured to perform pattern matching to derive atomic facts, each fact being associated uniquely with a pair of a document instance and its recipient. In one embodiment, the verification engine is configured to use data from a current document and external data points derived from external databases to generate said facts. Preferably, the verification engine is configured to use said facts within document semantic checking rules to identify a specific message, infographic or other additional content to be added to the document for document enrichment.

In one embodiment, said document enrichment content is added to locations available within the mark-up language schema, wherein the mark-up language taxonomy is configured to represent data from any document generation system, including nodes for encapsulated data at different levels of granularity, and the taxonomy is configured with nodes for added data for document enrichment. In one embodiment, said enrichment is performed to provide point-in-time and real time messaging to a document recipient. In one embodiment, the verification engine is configured to perform said real time messaging via real time interfaces into a customer profiling system in addition to adding content to a document instance. Preferably, the verification engine is configured for dynamic creation and management of semantic checking rules using said facts.

In one embodiment, the verification engine is configured to extract meta data from document instances and to perform global tests on document batches using said meta data.

In one embodiment, the interface is configured to re-receive rejected document instances in a feedback loop only upon re-feeding the document through a modification stage and back into the document interface before normalisation.

In one embodiment, the system comprises a first branch of data processors including a file management bank of servers providing said interface and an integration tier of servers providing said verification engine processing, and second branch being configured for document presentment to document recipients.

In one embodiment, the verification engine is configured to perform pattern matching to derive atomic facts, each fact being associated uniquely with a pair of a document instance and its recipient, and wherein the integration tier of servers is configured to perform dynamic generation of said facts and to store them in database servers of the second branch, and wherein the second branch stores metadata that summarises key data within each document, and also stores and receives and stores documents in output formats for presentment.

In one embodiment, the second branch includes a buffer for presenting the documents over electronic channels with an API that converts each document's data and associated metadata into a lightweight format for delivery to Web-based applications and to render the documents in electronic format to end user scripts within browsers.

In one embodiment, the second branch includes databases configured to store meta data arising from both a presentment document stream in the second branch and verification and enrichment data from the first branch, including said facts.

In one embodiment, the second branch is configured to perform personalisation of the documents using said facts.

In one embodiment, the second branch is configured to collate said facts to generate a complex decision rule which is executed in real time to ensure that a recipient receives personalised document relevant to their context.

In one embodiment, the second branch is configured to import data from an external data warehouse, and the system comprises an analytics engine to execute rules using said imported data.

In another aspect, the invention provides a document verification method performed by data processing servers, the method comprising steps of:
receiving electronic document runs at a presentment stage from document generation systems in excess of 500,000 documents;
transferring each document to an instance in a mark-up language taxonomy with one instance per document;
performing per-document checking by checking each document instance including semantic checking using granular semantic rules within groups of items of document data,
storing document instances in a relational database and to set a state including a rejected state, and to remove document instances if errors are detected;
maintaining current data item contents of each group and maintaining verification rules for execution for said semantic checking within each group; and
providing per-document error feedback arising from verification, and providing feedback without affecting operation of a system which generates the documents.

In one embodiment, the method comprises fragmenting the received documents into processing jobs shared out to a cluster of data processing servers using middleware whereby the data processing servers read input document files in parallel in streams, and mapping each document to a mark-up language taxonomy to create said document instances, and verifying the documents in real time upon receipt of the document instances, and in which at least some of said servers are configured as multi-threaded platforms that process the document instances in parallel.

In one embodiment, the documents include numerical values and the semantic checking includes numerical value calculations within said groups of data items.

In one embodiment, the method includes performing pattern matching to derive atomic facts, each fact being associated uniquely with a pair of a document instance and its recipient, and using data from a current document and external data points derived from external databases to generate said facts.

In one embodiment, the method includes using said facts within document semantic checking rules to identify a specific message, infographic or other additional content to be added to the document for document enrichment.

In one embodiment, said document enrichment content is added to locations available within the mark-up language schema, wherein the mark-up language taxonomy is configured to represent data from any document generation system, including nodes for encapsulated data at different levels of granularity, and the taxonomy is configured with nodes for added data for document enrichment.

In one embodiment, said enrichment is performed to provide point-in-time and real time messaging to a document recipient.

In one embodiment, the method includes performing said real time messaging via real time interfaces into a customer profiling system in addition to adding content to a document instance.

In one embodiment, the method includes dynamic creation and management of semantic checking rules using said facts.

In one embodiment, the method includes extracting meta data from document instances and performing global tests on document batches using said meta data.

In one embodiment, the method includes re-receiving rejected document instances in a feedback loop only upon re-feeding the document through a modification stage and back into the document interface before normalisation.

In one embodiment, the servers comprise a first branch of data processors including a file management bank of servers which perform said interfacing and an integration tier of servers performing said verification processing, and a second branch of servers for document presentment to document recipients.

In one embodiment, the verification engine performs pattern matching to derive atomic facts, each fact being associated uniquely with a pair of a document instance and its recipient, and wherein the integration tier of servers performs dynamic generation of said facts and stores them in database servers of the second branch, and wherein the second branch stores metadata that summarises key data within each document, and also stores and receives and stores documents in output formats for presentment.

In one embodiment, the second branch includes a buffer which presents the documents over electronic channels with an API that converts each document's data and associated metadata into a lightweight format for delivery to Web-based applications and to render the documents in electronic format to end user scripts within browsers.

In one embodiment, the second branch includes databases configured to store meta data arising from both a presentment document stream in the second branch and verification and enrichment data from the first branch, including said facts.

In one embodiment, the second branch performs personalisation of the documents using said facts.

In one embodiment, the second branch collates said facts to generate a complex decision rule which is executed in real time to ensure that a recipient receives personalised document relevant to their context.

In another aspect, the invention provides a non-transitory computer readable medium comprising software code for performing the steps of a method of any embodiment when executing on a digital processor.

Additional Statements

According to the invention, there is provided a document verification system comprising:

an interface for receiving document runs in excess of 500,000;

a normalisation component for transferring each document to an instance in a mark-up language taxonomy;

a verification component for performing per-document checking; and a feedback component arranged to provide per-document error feedback.

In one embodiment, the system verification component is configured to perform semantic checking. In one embodiment, the semantic checking is within groups of document data. Preferably, the groups of data are per-product as defined by configurable rules. In one embodiment, the verification component is configured to perform global tests on document batches using extracted meta data. In one embodiment, the verification system interface is arranged to receive document feeds at the stage of presentment.

In one embodiment, the documents include invoices and the semantic checking includes financial value calculations. In one embodiment, the feedback component is arranged to provide feedback without affecting operation of a system which generates the documents.

In one embodiment, the normalization component is configured to normalize the documents into a common and uniform XML taxonomy with one instance per document. In one embodiment, the interface and the normalization component are configured to read groups of greater than 500,000 documents in batch export files, map the documents to the XML taxonomy, and then stream documents instances out in a sharing arrangement to a cluster of data processing servers of the system verification component. Preferably, the normalization component comprises Message Oriented middleware for distributing the instances to the servers.

In one embodiment, the verification component servers are configured as multi-threaded platforms that process the document instances in parallel.

In one embodiment, the verification component is configured to validate the instances, to perform pattern matching for relevant facts, and implement verification rules, and to perform output actions such as generation of a print stream. In one embodiment, the verification component is configured to remove documents if errors are detected. In one embodiment, the verification component is configured to store document instances in a relational database and to set a state including a rejected state.

In one embodiment, the interface is configured to re-receive rejected document instances in a feedback loop. In one embodiment, the verification component is configured to perform enrichment of the document instances to add verification rule data and personalisation data.

In one embodiment, the enrichment is to assist in both point-in-time and real time messaging to a user such as the intended recipient of the document or an agent of the host organisation. In one embodiment, said real time messaging is via real time interfaces into a customer profiling system to allow for a complex real time decision.

In another aspect, the invention provides a document verification method comprising the steps of:

an interface receiving document runs in excess of 500,000;

a normalisation component transferring each document to an instance in a mark-up language taxonomy;

a verification component performing per-document checking; and a feedback component providing per-document error feedback for at least some documents.

In one embodiment, the system verification component performs semantic checking. In one embodiment, the semantic checking is within groups of document data. In one embodiment, the groups of data are per-product as defined by configurable rules. In one embodiment, the verification component performs global tests on document batches using extracted meta data.

In one embodiment, the verification system interface receives document feeds at the stage of presentment. In one embodiment, the documents include invoices and the semantic checking includes financial value calculations.

In one embodiment, the feedback component provides feedback without affecting operation of a system which generates the documents. In one embodiment, the normalization component normalizes the documents into a common and uniform XML taxonomy with one instance per document. In one embodiment, the interface and the normalization component read groups of greater than 500,000 documents in batch export files, map the documents to the XML taxonomy, and then stream documents instances out in a sharing arrangement to a cluster of data processing servers of the system verification component.

In one embodiment, the normalization component comprises Message Oriented middleware for distributing the instances to the servers. In one embodiment, the verification component servers process the document instances in parallel. In one embodiment, the verification component validates the instances, performs pattern matching for relevant facts, and implements verification rules, and performs output actions such as generation of a print stream. Preferably, the verification component removes documents if errors are detected. In one embodiment, the verification component stores document instances in a relational database and sets a state including a rejected state. Preferably, the interface re-receives rejected document instances in a feedback loop.

In one embodiment, the verification component performs enrichment of the document instances to add verification rule data and personalisation data. In one embodiment, the enrichment is to assist in both point-in-time and real time messaging to a user such as the intended recipient of the document or an agent of the host organisation.

In one embodiment, said real time messaging is via real time interfaces into a customer profiling system to allow for a complex real time decision.

In another aspect, the invention provides a computer readable medium comprising non-transitory software code for performing the steps of a method as defined in any embodiment when executing on a digital processor.

DETAILED DESCRIPTION OF THE INVENTION

Brief Description of the Drawings

The invention will be more clearly understood from the following description of some embodiments thereof, given by way of example only with reference to the accompanying drawings in which.

Description of the Embodiments

A verification system of the invention has software-implemented functions to perform a document verification process.

Figure 1:
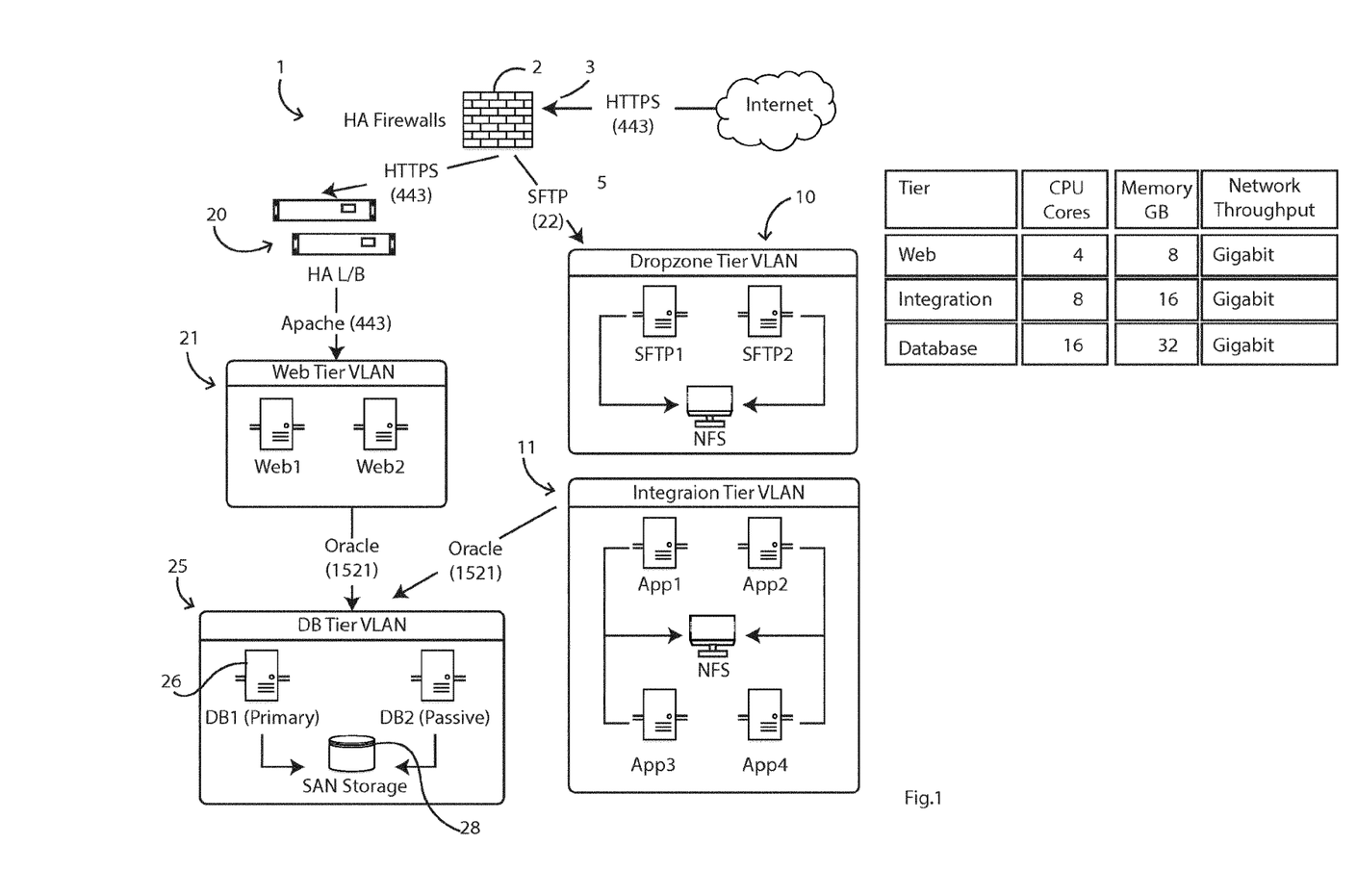
FIG. 1 is a block diagram showing the major components of a document verification system of the invention.

Referring to FIG. 1 a verification system 1 at a general level is illustrated. The system 1 comprises a bank 2 of firewalls for receiving data from external sources, including batches of over 500,000 documents to be verified. The primary interface into the firewalls 2 is an SSL interface 3 providing secure file transfer for such batches.

There are two main branches from the firewalls 2, a first branch through Dropzone Tier VLAN and Integration Tier VLAN systems 10 and 11 for core document verification processing, and a left hand branch through router, Web Tier VLAN, and DB Tier VLAN systems 20, 21, and 25 for presentment of the documents (sending to the recipients).

The VLAN system 10 is a file transfer system executing Dropzone Java Script (DropzoneJS) acting as a buffer for receiving the document batches, comprising a number of servers in a local area network having a NFS ("network file system) file share arrangement. The file transfer system 10 receives the files via an SFTP interface providing onward secure file transfer on this side of the firewall.

The integration tier VLAN 11 performs the majority of the core document verification and enrichment processing. It comprises a number of application servers, with in one example 8 CPU cores and 16 Gbit of memory. An advantageous aspect of the core processing in the Integration Tier VLAN 11 is dynamic generation of "Facts", atomic items of data which are dynamically generated and managed in the sub-system 25 databases. Each Fact is associated with one document and one document recipient (typically a subscriber of a utility service which sends the documents).

The left hand branch 20, 21, 25 receives the presentment data for the documents, including an XML instance that fully describes the data within the document and all associated metadata that summarises the key important data within the document. This branch also receives and stores the generated document outputs, in PDF and AFP print output formats.

The Web Tier VLAN file handling system 21 provides a buffer for this branch, it is used to present the documents over electronic channels, this is via an API that converts the document data and associated metadata into a lightweight Javascript Object Notation (JSON) format for delivery to Web-based applications. To render the documents in electronic format to the end user, scripts within the web browsers are used.

The DB Tier VLAN 25 includes a primary database (DB1) 26, a passive or secondary database (DB2) 27, and a SAN (Storage Area Network) 28.

The DB1 stores meta data arising from both the presentment branch and verification and enrichment processing. There may for example be in the range of 25 to 100 items of data for each document, such as document status and numerical summary data. The DB2 stores the Facts which are generated by the core verification and enrichment processing in the branch 10/11.

The enrichment processing is to add ancillary content such as information about promotions or descriptions of services, or to add infographics. It is not to add core document data, as this has been generated by a source document generation system such as a legacy billing system, and the documents are at the stage of presentment when they arrive at the system 1 as far as the document generation system is concerned.

As is described in more detail below, the Integration Tier VLAN 11 in conjunction with the file sharing system 10 operates as a normalisation component to generate an XML instance per document, populated by normalised document data linked in a tree schema.

This allows the Integration Tier VLAN 11 to operate as a verification engine to not only verify the document data by performing semantic tests, but also to dynamically retrieve and generate additional content for document enrichment. It is very advantageous that the verification and enrichment is performed at the stage of presentment, with the two branches (20/21/25 and 10/11) being in parallel and interlinked. The document generation system, such as a legacy billing system, can operate in its normal manner to generate the hundreds of thousands of documents in an efficient manner, albeit in need of verification and preferably also content enrichment. The system 1 performs all of the verification and enrichment operations downstream of the document generation system and so does not affect its operation, other than to send feedback in an indirect manner. This allows for verification and audit at a visual, business rule and numerical level with a feedback to the legacy system for issues to remediate.

This downstream verification is possible because the verification engine performs semantic checks across groups of data items in each document instance. While there is enrichment, this is not to the core document data, only ancillary information including recipient messages for things such as service information. Importantly, this does not affect the operation of upstream document generation system, which may be a billing system.

Moreover, the processing of the system 1 generates very valuable meta data in the DB1 database for document recipient data management and Facts in the DB2 database for document processing in addition to the finalised documents (in the SAN) for final presentment. In more detail, this structure provides the benefits of granular personalisation of the documents. Using Facts inferred from the document data specific details about the user and the document are inferred that may be used for the content enrichment to, for example, explain costs, offer new products and services and provide other pro-active care messages. This is facilitated by a rule layer that allows for multiple Facts to be collated in a more complex rule known as a Decision. The decision may then be evaluated in real time to ensure the recipient receives a real time personalised document relevant to their context. Facts may also be imported from external Data Warehouse and other Decision Support Systems to ensure existing analytics may be used for the document presentment to effect complex business rules using billing and other analytics and real time data sets.

The Integration Tier VLAN 11 also generates indirect feedback for the document generation (for example, billing) system. This feedback is performed in a manner which does not affect presentment unless a document cannot be sent despite the verification and enrichment. Verification checks may be set to a warning level or a failure level to support this, and documents that fail at warning level provide reporting on verification issues but do not fail the processing of the document.

Figure 2:
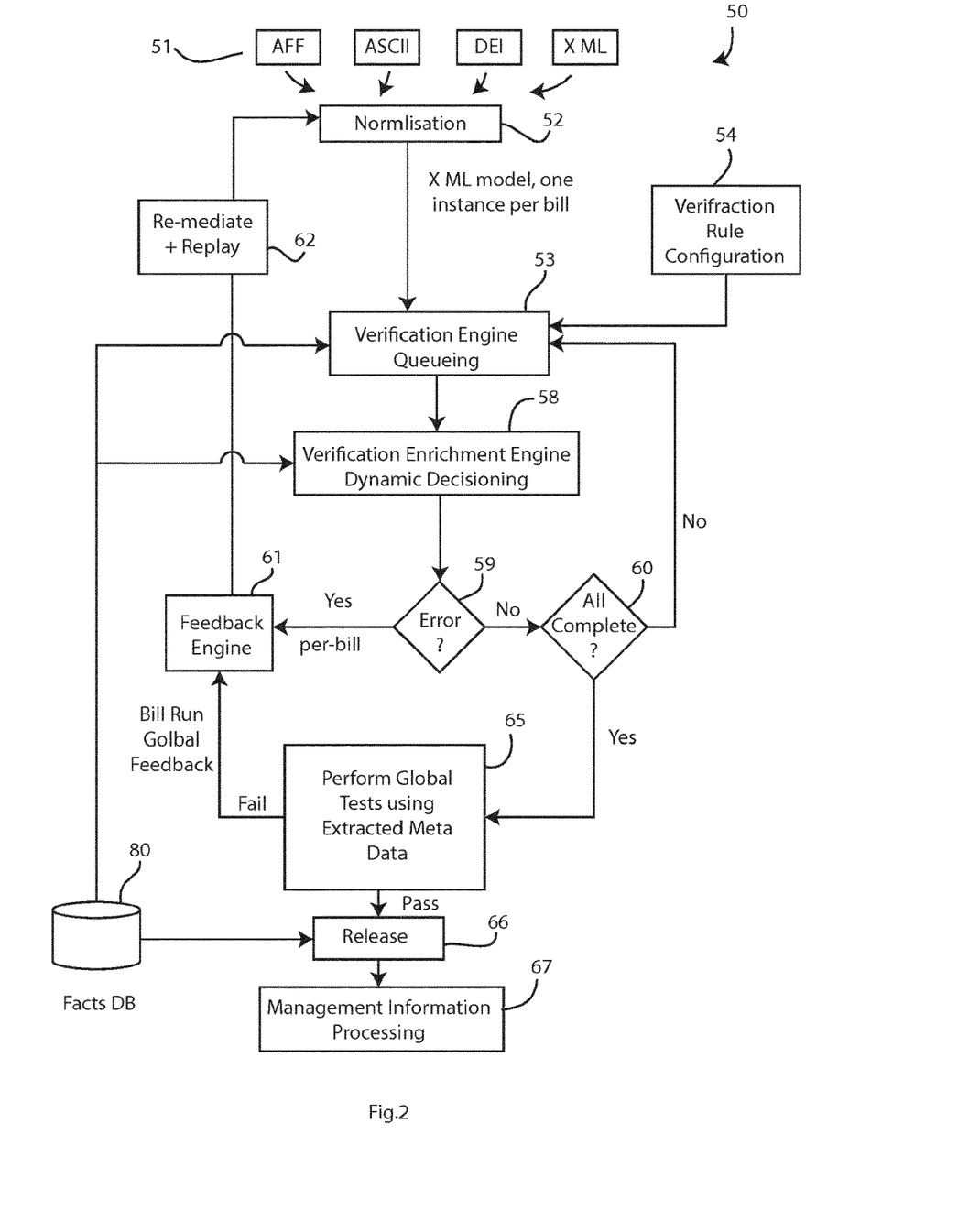
FIG. 2 is a flow diagram showing the major steps performed by the document verification system.

FIG. 2 shows the overall flow of a method 50 performed by the system 1 beginning with receipt of greater than 500,000 documents and ending with presentment of the documents, in one example invoices being sent physically or in electronic form to customers. The stages illustrated in FIG. 2 include the dynamic verification and content enrichment referred to above.

Figure 3:
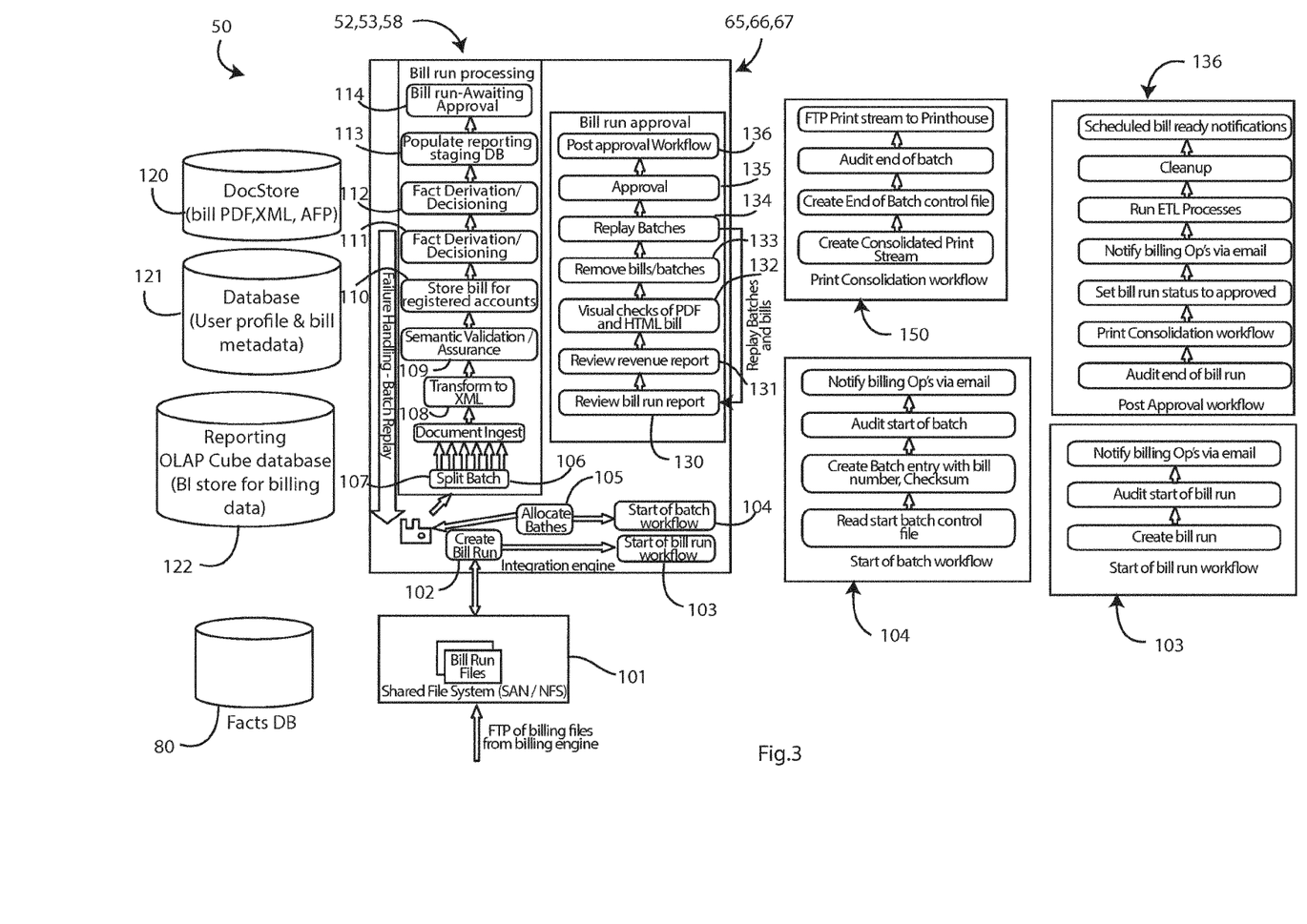
FIG. 3 is a set of flow diagrams for the system, showing some stages in more detail.

FIG. 3 shows more process step detail, especially for normalization 52, verification engine queuing 53, and enrichment and verification 58. These steps shown in FIG. 2 include Fact derivation and decisioning steps 111 and 112, using and populating a Facts database 80 using data from a document store database 120, user profile and bill meta data database 121, and a reporting Cube database 122. The database 122 includes product catalogue data defining the products or services being provided to the customer, and other customer relationship management ("CRM") data. The Facts are exported across from the database 80 in the verification branch to the to the database system 25 in the presentment branch subsequently.

Each Fact is an atomic item of data derived from the various sources including the above databases. A Fact is specific to a customer and to a particular document. It is dynamically generated during performance of the method 50. The Facts are however retained for later use.

Documents such as invoices generated by one or more document generation system are transmitted to the verification system in a variety of formats 51 such as AFF, ASCII, EDI and XML.

In step 52 the verification system normalizes the documents into a common and uniform mark-up language (XML in this case) taxonomy, one instance per document.

The formats are read in groups of several hundred thousand from batch export files and broken up into smaller fragments (typically 20 to 30 thousand documents per fragment) for processing. The fragment processing jobs are then shared out to a cluster of data processing servers (by the file sharing and integration tiers 10 and 11) using Message Oriented middleware. The servers 10 and 11 read the input files in a stream, splitting out each document instance and mapping it to the XML taxonomy.

The servers are configured as multi-threaded platforms that process the document instances in parallel, typically validating the document instances, pattern matching for relevant facts or events and implementing software rules and output actions such as generation of a print stream. The Facts or events may be configured in the system.

Because of transforming the data into an XML taxonomy-defined format, further processing the document run data with enriched software rule and personalisation information is possible. The system can perform semantic rule checks on the document data to ensure correctness and performing other steps necessary for presentment of the document data. This aspect also allows the system to carry document data from any documenting engine or multiple documenting engine inputs. The XML taxonomy models any documented service and covers the full complexity of documenting data while existing as a decoupled representation of that data.

Enrichment of each XML instance is performed according to rules to add personalisation data and to assist in both point-in-time and real time messaging to the end user. The XML instance is enriched with external data from existing data analytics and warehousing systems 120, 121, and 122 and also with 'Facts' derived by the system from analytics of the document (in this case, billing, data. The software rules may then be created in step 54 in a Web management console to create complex decision logic to identify a user for a given personalised insert (this can be a message or an infographic). These decisions may be applied to personalise the document for all document output channels (such as Web, print, 3$^{rd}$ party applications). Real time messaging may be achieved via real time interfaces into the utility organisation's customer profiling systems to allow for a complex real time decision when the document data (for example documented or undocumented utility service usage) is being viewed. An example is to use past trends for data usage with other customer internal profiling data to select that customer for an upgrade. When used together they may result in an offer for a new package or service.

In step 53 the XML instances are queued for feeding to the real time verification and enrichment engine 11 in step 58. The verification and enrichment engine performs semantic checking by initially automatically grouping data items within each document to "products". A "product" is defined as a group of data items that has been created to offer one or more services to the customer. This grouping of one or more services is typically maintained in a product catalogue that links product names, associated services, and pricing information.

Within each product the engine performs a series of semantic checks driven by per-product checking rules. This might be as simple as checking totals for financial values in a column, or alternatively that a given product has only certain charges included or that certain individual charges tally to an overall service usage charge.

As shown by step 59 if there is an error in an XML instance, a feedback engine 61 is notified and it feeds an error message back to a re-mediation and replay engine 62. The failure reason may be viewed, the input documenting data may be fixed and if required re-exported from the invoicing system, and the document data re-run through the processing workflow.

As shown by the step 60 there is a cycle for each XML instance until the batch is complete. Then, in step 65 global tests are performed, such as validation with input control totals such as number of documents, number of pages within each document, and revenue totals. This can provide error feedback to the engine 61 also.

The batch may be released in step 66, and management information reports are generated in step 67.

Referring to FIG. 2 the verification process 50 is illustrated in more detail. The queuing, verification, and enrichment steps 52, 53 and 58 include the following sub-steps:

102, Creating a document run;

103, Activating a document run workflow;

104; Activating a workflow for a first batch within the full run;

105, Allocating batches to processors and software functions for parallel operation;

106; Batch split into fragments in the range of 20,000 to 30,000 document instances;

107, Document ingest to the selected processors in a shared manner for load balancing.

108, Transformation to XML. This XML representation is an XML schema taxonomy that can represent billing data from any billing engine, this encapsulated billing data ranging from bill summary through product costs and down to granular usage level. This taxonomy supports enrichment with decisioning data and other billing related metadata to facilitate granular dynamic personalisation

109, Semantic validation; this is the validation of the document instance from a number of perspectives. A typical example for bills, statements and other formats is a financial tally of the document to ensure it adds up. Other semantic checks can validate that there are no anomalies with products and services and can also validate that the customer is receiving the services that they have ordered. This can be performed on every document instance within a large batch of documents, with documents failing the semantic check being marked with that failure for later reporting, analysis and remediation.

110, Storing documents for presentation to online systems using the platform or third party applications that access the data via a lightweight internet API;

111, 112, Decisioning. This is facilitated by a dynamic decisioning capability that creates and manages software rules using atomic billing and related data points. This is supported by decision prioritization and dynamic templates that support ad-hoc messaging to the customer based on prioritised rules and 'Live Areas' within the template designed for dynamic messaging.

113, Updating verification logs in a database;

114, Document run approval according to feedback from all batch verifications.

The steps 65, 66 and 67 of FIG. 2 include the following steps in FIG. 3:

130, Reviewing a document run report.

131, Reviewing a revenue report.

132, Visual checks via manual validation by a documenting quality audit team, which may view the document before it is released. This may involve removing documents from the document run due to issues resulting from checks or known issues from the documenting engine. The documents, once processed, are stored in an XML document instance with their state in a relational database. The document instance's state may be changed by the system to be 'rejected'. Once 'rejected', they may be re-exported from the documenting engine and re-ingested into the platform. This allows for a higher level of quality of documenting data for presentation.

133, Returning particular batches for re-mediation and replay.

134, Batch replay.

135, Approval.

136, Post-approval workflow.

The overall document run feed is from a shared file system SAN 101 and the following databases are used:

120, source document documents;

121, document metadata and verification profile parameters;

122, reporting database.

These three databases feed into the Facts database 80.

The semantic rule checks validate that constituent parts of the document are correct by adding sub-totals by product and ensuring that all sub sections of the document tally to the document total. They also affect custom rules created by the user to ensure rules pertaining to the underlying products and services are adhered to. In the event of failure of these checks the document is marked as failed with the failure retained for analysis and remediation.

The following is an example of the rules for semantic checks.

The system 1 maps billing data (i.e., from billing engine extract formats) into an internal XML schema defined format, which breaks down all billed costs into distinct sections referred to as 'Bill Items'. Bill Items may be global or linked to a specific asset/service (MSISDN, Cable device, home phone, etc.). Global bill items are account level charges, usage (not linked to an asset) or discounts.

By default, the Semantic Check function performs the following checks in this order Calculates all fixed and usage costs (incl. taxes) and discounts for each asset/service to see it matches the asset total costs Calculates call detail record costs to match usage costs for the asset (this may be disabled). This check is again on costs and not on any usage metrics (e.g., call minutes, data MB usage).

Calculates any account level service, discount and usage costs and taxes plus asset level service and usage costs in the account summary to match the bill total In addition to these checks the system also adds the following checks:

Ensure that the total services cost for a given service type (e.g., wireless or home phone) matches the account level cost for that service type Ensure that the total of savings across all services matches the account level savings value These checks are carried out as the bill data is processed in the bill run and so are carried out on all bills. This also means that checks are carried out on the internal system XML structure and not on the final PDF/HTML output.

These checks may be configured to have a tolerance to allow for known rounding issues and call level checks may be disabled.

Failure of the semantic check results in the bill failing to process; it is then stored in a failed bills table with the failed payload, the result code and failure reason retain the failure reason and specific item the check failed on. The failure reason and result code may be viewed in the bill run report.

The following are examples of the default semantic checks performed by the system:

Example 1—Asset/Service Level Costs

All costs associated with a given asset/service will be summed.

Example 2—Usage Level Costs

All costs associated with usage for a given asset/service are summed. This sums costs and not individual service metrics such as call duration (minutes/seconds).

Example 3—Account Level Costs

The account level costs will be summed and validated.

Example 4—Service and Account Level Costs

The cost for each service type will be summed and compared with the account level cost for that service.

Example 5—Service and Account Level Savings

The savings for each service type are summed and compared with the account level savings.

The final output is saved to the servers system 25 for presentment, prior to presentment of the document to the account owner a document run approval process is undertaken.

The verification system 11 is used to monitor document runs in real time, report on document run failures, allow for document run reviews and allow for the approval of document runs for release.

Real time monitoring of document runs shows the status for an active document run. This shows speed of processing, number of documents completed, number failed, number outstanding to be processed as well as a further detailed breakdown of each batch of document run files processed.

When a document run has completed the document run report may be viewed. This shows the total financial amount contained within the processed documents awaiting approval, failed documents, and failure reasons.

Documents and batches of documents may be removed from the document run, and if these are known to be in error or do not pass visual or other inspection steps they may be removed and re-run through the platform incrementally.

Once the document run report has been viewed the document run may be approved for release by the user. This initiates the creation of the print stream for printed documents, releases electronic documents for web and email presentment, sends control files and notifications to operations staff and initiates the notification to documenting account owners of the availability of a new document.

Post approval, the documenting metadata is stored to a data warehouse for business intelligence for deeper analysis of revenue by product, segment, call type, brand and other skews on the data set.

It will be appreciated that as the process is performed at the end of a document generation system's operations, it avoids need to modify legacy documenting systems for added verification functionality. Also, it provides comprehensive verification feedback, both per individual document and for a full run of hundreds of thousands of documents. Further, the system efficiently verifies with excellent integrity large batches of documents, of the order of one million to two million for example.

The above are achieved, while still having the capability to add content, document enrichment, to optimise communication between the document generating organisation and the recipient. This is achieved without affecting generation of the document generation systems.

Other major advantages include the semantic validation of all documents prior to presentment including documenting operations and user-created semantic rules. It also allows for detailed inspection of reports across the entire document run prior to approval. The standardised XML taxonomy allows for normalisation of data from multiple document generation systems, thus allowing for a common set of business rules and presentation rules and logic to be applied regardless of the document generation system. The system allows for analytics of the documented data set across multiple documenting engines with a standardised analytics data set to support this.

The approval workflow ensures documents and batches of documents may be removed from the document run, re-run and then approved in one group, this improves accuracy and revenue collection while reducing manual intervention.

The ability to semantically validate all documents in a document run while processing is very advantageous. The use of an XML model to normalise documenting data allows for semantic rules to be easily and rapidly created and applied. The ability to review key data regarding a full document run and remove or replay documents before approving for release is also a key differentiating business process.

The invention is not limited to the embodiments described but may be varied in construction and detail.

The invention claimed is:

1. A document verification system comprising digital data processors programmed to provide:
   an interface configured to receive electronic document runs at a presentment stage from document generation systems in excess of 500,000 documents;
   a normalisation component configured to transfer each document to an instance in a mark-up language taxonomy with one instance per document;
   a verification engine configured to perform per-document checking by checking each document instance including semantic checking using granular semantic rules within groups of items of document data, wherein the verification engine is configured to store document instances in a relational database and to set a state including a rejected state, and to remove document instances if errors are detected;
   a rule server configured to maintain current data item contents of each group and to maintain verification rules for execution for said semantic checking within each group; and
   a feedback component arranged to provide per-document error feedback arising from operation of the verification engine, wherein the feedback component is arranged to provide feedback without affecting operation of a system which generates the documents.

2. A document verification system as claimed in claim 1, wherein the verification system interface is configured to fragment the received documents into processing jobs shared out to a cluster of data processing servers of said normalization component using middleware whereby the data processing servers can read input document files in parallel in streams, and the normalization component is configured to map each document to a mark-up language taxonomy to create said document instances, and wherein the verification engine is configured to verify the documents in real time upon receipt of the document instances, and in which wherein the verification engine servers are configured as multi-threaded platforms that process the document instances in parallel.

3. A document verification system as claimed in claim 1, wherein the documents include numerical values and the semantic checking includes numerical value calculations within said groups of data items.

4. A document verification system as claimed in claim 1, wherein the verification engine is configured to perform pattern matching to derive atomic facts, each fact being associated uniquely with a pair of a document instance and its recipient.

5. A document verification system as claimed in claim 4, wherein the verification engine is configured to use data from a current document and external data points derived from external databases to generate said facts.

6. A document verification system as claimed in claim 4, wherein the verification engine is configured to use said facts within document semantic checking rules to identify a specific message, infographic or other additional content to be added to the document for document enrichment.

7. A document verification system as claimed in claim 6, wherein said document enrichment content is added to locations available within the mark-up language schema, wherein the mark-up language taxonomy is configured to represent data from any document generation system, including nodes for encapsulated data at different levels of granularity, and the taxonomy is configured with nodes for added data for document enrichment.

8. A document verification system as claimed in claim 7, wherein said enrichment is performed to provide point-in-time and real time messaging to a document recipient.

9. A document verification system as claimed in claim 8, wherein the verification engine is configured to perform said real time messaging via real time interfaces into a customer profiling system in addition to adding content to a document instance.

10. A document verification system as claimed claim 4, wherein the verification engine is configured for dynamic creation and management of semantic checking rules using said facts.

11. A document verification system as claimed in claim 1, wherein the verification engine is configured to extract meta data from document instances and to perform global tests on document batches using said meta data.

12. A document verification system as claimed in claim 1, wherein the interface is configured to re-receive rejected document instances in a feedback loop only upon re-feeding the document through a modification stage and back into the document interface before normalisation.

13. A document verification system as claimed in claim 1, wherein the system comprises a first branch of data processors including a file management bank of servers providing said interface and an integration tier of servers providing said verification engine processing, and second branch being configured for document presentment to document recipients.

14. A document verification system as claimed in claim 13, wherein the verification engine is configured to perform pattern matching to derive atomic facts, each fact being associated uniquely with a pair of a document instance and its recipient, and wherein the integration tier of servers is configured to perform dynamic generation of said facts and to store them in database servers of the second branch, and wherein the second branch stores metadata that summarises key data within each document, and also stores and receives and stores documents in output formats for presentment.

15. A document verification system as claimed in claim 14, wherein the second branch includes a buffer for presenting the documents over electronic channels with an API that converts each document's data and associated metadata into a lightweight format for delivery to Web-based applications and to render the documents in electronic format to end user scripts within browsers.

16. A document verification system as claimed in claim 15, wherein the second branch includes databases configured to store meta data arising from both a presentment document stream in the second branch and verification and enrichment data from the first branch, including said facts.

17. A document verification system as claimed in claim 16, wherein the second branch is configured to perform personalisation of the documents using said facts.

18. A document verification system as claimed in claim 17, wherein the second branch is configured to collate said facts to generate a complex decision rule which is executed in real time to ensure that a recipient receives personalised document relevant to their context.

19. A document verification method performed by data processing servers, the method comprising steps of:
receiving electronic document runs at a presentment stage from document generation systems in excess of 500,000 documents;
transferring each document to an instance in a mark-up language taxonomy with one instance per document;
performing per-document checking by checking each document instance including semantic checking using granular semantic rules within groups of items of document data, storing document instances in a relational database and to set a state including a rejected state, and to remove document instances if errors are detected;
maintaining current data item contents of each group and maintaining verification rules for execution for said semantic checking within each group; and
providing per-document error feedback arising from verification, and providing feedback without affecting operation of a system which generates the documents.

20. A non-transitory computer readable medium comprising software code executable by a digital processor to perform steps of:
receiving electronic document runs at a presentment stage from document generation systems in excess of 500,000 documents;
transferring each document to an instance in a mark-up language taxonomy with one instance per document;
performing per-document checking by checking each document instance including semantic checking using granular semantic rules within groups of items of document data, storing document instances in a relational database and to set a state including a rejected state, and to remove document instances if errors are detected;
maintaining current data item contents of each group and maintaining verification rules for execution for said semantic checking within each group; and
providing per-document error feedback arising from verification, and providing feedback without affecting operation of a system which generates the documents.

* * * * *